United States Patent
Nishimura et al.

(10) Patent No.: US 6,752,969 B1
(45) Date of Patent: Jun. 22, 2004

(54) HONEYCOMB STRUCTURAL BODY

(75) Inventors: Mamoru Nishimura, Nagoya (JP); Keiji Ito, Nagoya (JP)

(73) Assignee: Denso Corporation, Aichi-Pref (JP)

( * ) Notice: Subject to any disclaimer, the term of this patent is extended or adjusted under 35 U.S.C. 154(b) by 0 days.

(21) Appl. No.: 09/444,298

(22) Filed: Nov. 22, 1999

(30) Foreign Application Priority Data

Nov. 30, 1998 (JP) .............................. 10-339526
Oct. 12, 1999 (JP) .............................. 11-289715

(51) Int. Cl.[7] .............................................. B01D 53/34
(52) U.S. Cl. ..................... 422/180; 422/177; 428/116; 502/439
(58) Field of Search ................................ 422/179–181, 422/171, 177; 428/116–118; 392/485; 55/523; 264/177.11, 629–631; 502/4, 527.24, 60, 439; 501/53, 118

(56) References Cited

U.S. PATENT DOCUMENTS

| | | | | |
|---|---|---|---|---|
| 4,722,916 A | * | 2/1988 | Watanabe et al. | ........... 501/118 |
| 4,849,275 A | * | 7/1989 | Hamaguchi et al. | ........ 428/116 |
| 5,371,056 A | * | 12/1994 | Leyrer et al. | ................. 502/66 |
| 5,545,243 A | * | 8/1996 | Kotani et al. | ................. 55/523 |
| 5,549,725 A | | 8/1996 | Kasai et al. | ................... 55/523 |
| 5,634,952 A | * | 6/1997 | Kasai et al. | ................... 55/302 |
| 5,680,503 A | * | 10/1997 | Abe et al. | .................... 392/485 |
| 5,763,347 A | * | 6/1998 | Lai | ............................. 502/4 |
| 5,938,992 A | * | 8/1999 | Hamanaka et al. | ........... 264/43 |
| 6,077,483 A | * | 6/2000 | Locker et al. | ............... 422/179 |
| 6,117,377 A | * | 9/2000 | Makino et al. | ........ 264/177.11 |

FOREIGN PATENT DOCUMENTS

| | | |
|---|---|---|
| EP | 0857511 | 8/1998 |
| JP | 7-163822 | 6/1995 |
| JP | 10-263416 | 10/1998 |

* cited by examiner

*Primary Examiner*—Hien Tran
(74) *Attorney, Agent, or Firm*—Nixon & Vanderhye PC

(57) ABSTRACT

There is provided a honeycomb structural body with a high cell density of 600 cells/in$^2$ or greater and excellent catalyst loading properties. In a honeycomb structural body comprising a plurality of cells formed by providing partition walls composed mainly of cordierite, which has the chemical composition $SiO_2$: 45–55 wt %, $Al_2O_3$: 33–42%, MgO: 12–18 wt %, in a honeycomb fashion, the density of the cells is at least 600 cells/in$^2$ and the pore volume of the partition walls is at least 30%.

8 Claims, 6 Drawing Sheets

HONEYCOMB STRUCTURAL BODY

BACKGROUND OF THE INVENTION

1. Field of the Invention

The present invention relates to a honeycomb structural body, made of cordierite, which can be used as a catalyst carrier in an exhaust gas purification apparatus for an internal combustion engine and, particularly, to a honeycomb structural body with a high cell density.

2. Description of the Related Art

Catalyst carriers for exhaust gas purification apparatuses have conventionally employed a honeycomb structural body 9 such as those shown in FIGS. 6 and 7, wherein partition walls 90 made of cordierite or the like are arranged in a honeycomb fashion to form multiple cells 99. An exhaust gas purification function is exhibited by carrying an exhaust gas purifying catalyst 8 on the surface of the partition walls 90 of the honeycomb structural body 9.

Incidentally, demands have been increasing in recent years for exhaust purification apparatuses with further improved purification functions and smaller sizes.

In order to satisfy the two demands of improved purification function and smaller size, it is effective to raise the cell density (increase the number of cells/in$^2$) of the honeycomb structural body, i.e. to increase the number of cells per unit area. This enlarges the cell surface area and increases the contact area between the exhaust gas and the catalyst.

To exhibit an effect of increased cells/in$^2$ of the honeycomb structural body it is necessary to fully maintain the exhaust gas channel so that no pressure loss occurs. It is therefore essential to avoid clogging of the cells when the catalyst is loaded. However, in high-cells/in$^2$ honeycomb structural bodies of 600 cells/in$^2$ or greater, cell clogging tends to occur, during catalyst loading, more readily than in conventional honeycomb structural bodies of low cells/in$^2$ (400 cells/in$^2$ or lower).

Loading of the catalyst is accomplished by coating the partition walls of the honeycomb structural body with a catalyst slurry, prepared using catalyst components, and drying it. The above-mentioned clogging tends to occur more easily with a higher solid concentration of the catalyst slurry (hereunder referred to as "slurry concentration"). Consideration has therefore been given to reducing the slurry concentration to prevent clogging. However, when it is simply attempted to achieve a low concentration for the catalyst slurry, too little catalyst is loaded by a single catalyst slurry application. It therefore becomes necessary to significantly increase the number of applications of the catalyst slurry, and this results in increased production cost.

The present invention, which has been accomplished in light of these circumstances, is aimed at providing a honeycomb structural body with a high cell density of 600 cells/in$^2$ or greater, and excellent loading properties of the catalyst.

SUMMARY OF THE INVENTION

The present invention relates to a honeycomb structural body comprising a plurality of cells formed by providing partition walls composed mainly of cordierite, which has the chemical composition SiO$_2$: 45–55 wt %, Al$_2$O$_3$: 33–42 wt %, MgO: 12–18 wt %, in a honeycomb fashion, the honeycomb structural body being characterized in that the cell density is at least 600 cells/in$^2$ and the pore volume of the partition walls is at least 30%.

The honeycomb structural body of the invention has a high cells/in$^2$, with a cell density of at least 600 cells/in$^2$, as stated above. If the cell density is less than 600 cells/in$^2$ the purification performance will not be significantly improved when the catalyst is loaded to construct the exhaust gas purification apparatus. A higher cell density is more preferred, but limitations exist due to production technology, etc.

In order to achieve a higher cells/in$^2$, it is essential to reduce the thickness of the partition walls. Specifically, the partition wall thickness is preferably no greater than 150 μm. When it exceeds 150 μm there is a risk of increased flow resistance (pressure loss) of the gas. The thickness is thus preferably no greater than 100 μm.

The pore volume of the partition walls, that is, the proportion of the volume constituted by fine pores per unit volume of the partition walls, is 30% or greater. If the pore volume is less than 30% there will be no improvement in the loading property of the catalyst, and it will require multiple repetitions of the step of coating the catalyst slurry containing the catalyst components. On the other hand, if the pore volume is too high the strength of the partition walls will be low.

The pore volume is therefore preferably 35–80%, with an upper limit of 50% being preferred.

The function of the invention will now be explained.

As mentioned above, the honeycomb structural body of the invention has a high cell density of 600 cells/in$^2$ or greater and a partition wall pore volume of at least 30%. Thus, when the catalyst is loaded onto the partition walls, it is possible to both prevent cell clogging and ensure the catalyst loading amount.

Specifically, by increasing the pore volume of the partition walls from the conventional average of 25% to at least 30%, the catalyst loading amount is greater than that according to the prior art when a catalyst slurry of the same concentration is applied. It is thus possible to lower the slurry concentration for loading the same amount of catalyst according to the prior art.

A lower slurry concentration can reduce occurrences of cell clogging.

Consequently, even when achieving a high cell density of 600 cells/in$^2$ or greater, if the pore volume of the partition walls is 30% or greater as explained above it is possible to prevent occurrence of cell clogging while ensuring the same catalyst loading amount as with the prior art.

According to the invention, therefore, it is possible to provide a honeycomb structural body with a high cell density of 600 cells/in$^2$ or greater and with an excellent catalyst loading property.

The thickness of the partition walls is preferably no greater than 80 μm. This allows the pressure loss in the fluid passing through the partition walls to be drastically reduced.

The average roughness Rz of the surface of the partition walls is preferably 1–5 μm. An average roughness Rz outside of the range of 1–5 μm can present the risk of lower adhesion of the catalyst to the partition walls. The reason for this is believed to be that the particle size of alumina powder used as a catalyst component is largely distributed in the range of 1–5 μm.

The mean size of the fine pores formed inside the partition walls is preferably 1–10 μm. If the mean size of the fine pores is less than 1 μm there will be a problem in that the alumina powder will not enter into the fine pores and adhesion will thereby be reduced, while if it exceeds 10 μm there will be a problem of reduced strength of the partition walls.

The honeycomb structural body may be a catalyst carrier wherein a catalyst is loaded onto the surface of the partition walls. The catalyst may be a ternary catalyst for purification of NOx, CO, HC, etc. Specific components include alumina powder, and mixtures of platinum, palladium, etc. In this case, the honeycomb structural body may be applied as a catalyst carrier in a catalytic converter for purification of automobile exhaust gas, for example.

For loading of the catalyst, the catalyst slurry concentration conditions will differ depending on the catalyst components that are loaded, but as an example, it is preferably carried out by coating the partition walls with a catalyst slurry having a solid concentration of no greater than 45%. If the solid concentration (slurry concentration) is greater than 45% a problem is presented of easier clogging in cells of 600 cells/in$^2$ or greater. On the other hand, if the slurry concentration is too low the catalyst loading amount is reduced, and therefore the lower limit for the slurry concentration is preferably 40%.

DESCRIPTION OF THE PREFERRED EMBODIMENTS

The invention will be hereafter illustrated by the following Embodiments, it being understood that the Embodiments are presented only for a better understanding of the invention without implying any limitation thereof.

Embodiment 1

Honeycomb structural bodies according to an embodiment of the invention will now be explained with reference to FIGS. 1 and 2.

For this embodiment, five different honeycomb structural bodies with different cell densities were fabricated, and their catalyst loading properties, etc. were compared. Four of the five bodies were products according to the invention (samples E1–E4), and one was a comparison product with a low cell density (sample C1).

Figure 1:
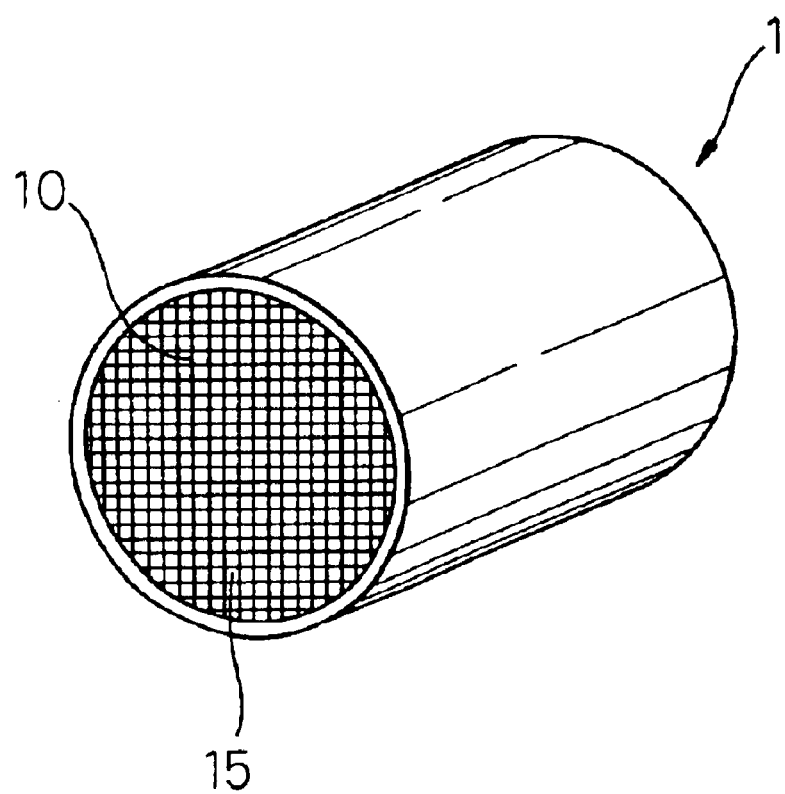
FIG. 1 is a perspective view showing the construction of a honeycomb structural body according to Embodiment 1.

Each of the present invention samples E1–E4 is, as shown in FIG. 1, a honeycomb structural body 1 comprising a plurality of cells 15 formed by providing partition walls 10 composed mainly of cordierite, which has the chemical composition $SiO_2$: 45–55 wt %, $Al_2O_3$: 33–42 wt %, MgO: 12–18 wt %, in a honeycomb fashion.

The density of the cells 15 is 600–1200 cells/in$^2$, and the pore volume of the partition walls 10 is 35%. The cells 15 of this embodiment have a square shape.

A method for production of the honeycomb structural bodies of this embodiment (samples E1–E4, C1) will now be explained.

First, a cordierite starting material was prepared as a material for the honeycomb structural body 1. The cordierite starting material used contained kaolin, aluminum hydroxide, alumina, talc, carbon particles, etc. The pore volume was adjusted by modifying the content of the carbon particles, kaolin, talc, aluminum hydroxide, etc.

The carbon particles are burned off during the firing, the kaolin and talc promote formation of pores by migration during the firing reaction process and the aluminum hydroxide causes vaporization of water of crystallization in the material, thus allowing accelerated formation of fine pores.

After then kneading a prescribed amount of the cordierite starting material and water as a binder, the mixture is extrusion molded into a honeycomb shape using a honeycomb structural body-molding die. The extrusion molded honeycomb-shaped intermediate material is then dried, cut to prescribed dimensions and fired. The firing was accomplished by raising the temperature to 1400° C. at a temperature raising rate of about 1° C./min and maintaining that temperature for 5 hours, after which it was gradually cooled to room temperature. The firing completed the honeycomb structural body 1.

The resulting samples E1–E4, C4 all had dimensions of 103 mm in diameter and 108 mm in length, and had a partition wall thickness of 100 μm and a pore volume of 35%. An outer perimeter fortifying structure was also employed having a high pore volume and a thicker partition wall around the perimeter to achieve the necessary strength. The fortifying range was within 3 cells from the outer perimeter to minimize gas resistance. The thickness of the fortified partition walls was 150 μm. The cell densities of the samples were 400 cells/in$^2$ for C1, 600 cells/in$^2$ for E1, 800 cells/in$^2$ for E2, 1000 cells/in$^2$ for E3 and 1200 cells/in$^2$ for E4.

The average roughness Rz of the surfaces of the partition walls 10 was adjusted to 1–5 μm for all the bodies. The mean size of the fine pores formed in the partition walls 10 was adjusted to 1–10 μm for all the bodies.

For this embodiment, each sample was then coated with a catalyst slurry each with a different slurry concentration, and the number of clogs per cell was measured. The loaded catalyst was a ternary catalyst comprising platinum and palladium, and it was loaded onto the partition walls 10 via alumina.

The catalyst slurry was prepared by adding water to the catalyst components to make a slurry. The catalyst slurry had the proportion of catalyst components (solid portion) to water adjusted to prepare four different conditions at 40, 45, 50 and 55%.

Each sample was immersed in a catalyst slurry of a different concentration held in a container, to coat of the surface of the partition walls with the catalyst slurry by dip coating. It was then dried and the number of clogs per cell was counted for each sample.

Figure 2:
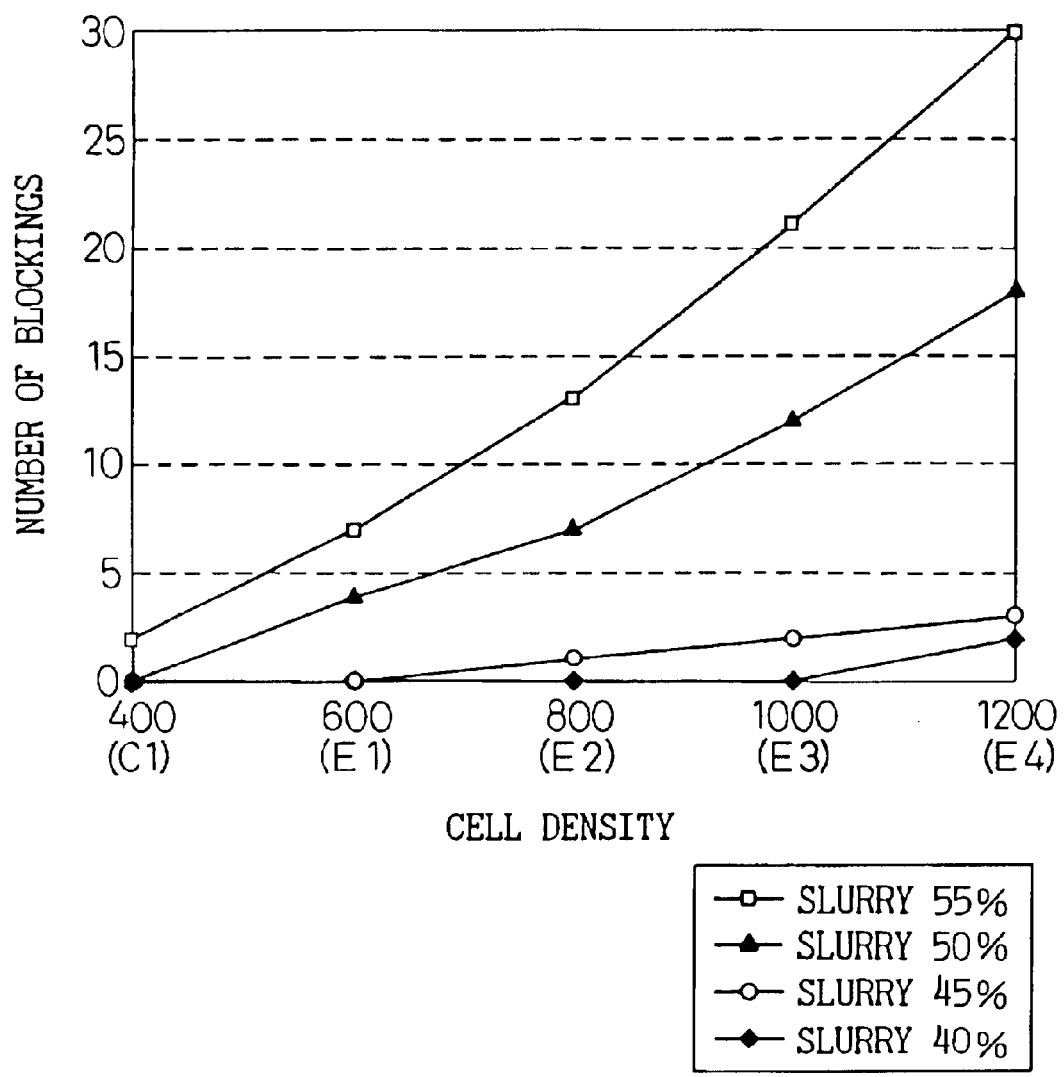
FIG. 2 is a graph showing the relationship between cell density and the number of cell blockings for Embodiment 1.

The measurement results are shown in FIG. 2. This graph has the cell density (cells/in$^2$) on the horizontal axis and the number of cell blockings on the vertical axis.

As is clear from this graph, the number of cell blockings increased with higher cell density at all the slurry concentrations. However, when the slurry concentration was 45% or lower, no clogging occurred up to at least 600 cells/in$^2$, and no more than 4 blockings occurred even with higher cell density.

These results demonstrate that with a pore volume of 35% as in this embodiment, cell clogging can be almost completely prevented by limiting the slurry concentration to 45%.

Embodiment 2

For this embodiment, sample E1 of Embodiment 1 was used as a standard to fabricate samples C2 and E5 with different pore volumes, and the catalyst loading amount ratios of each were determined.

Sample C2 was a comparison product with the content of the carbon particles, etc. in the cordierite starting material changed to change the pore volume to 25%. Sample E5 was a product according to the invention with the content of the carbon particles, etc. in the cordierite starting material also changed to change the pore volume to 50%. The other conditions for these samples C2 and E5 were the same as for sample E1 of Embodiment 1.

Samples E1, E5 and C2 were each coated once with catalyst slurry having a slurry concentration of 40–55%, and the ratio of the loaded catalyst amount (catalyst loading amount ratio) was determined for each. The catalyst loading amount ratio was calculated using 100 as the value for loading a catalyst slurry with a slurry concentration of 50% onto sample E1.

Figure 3:
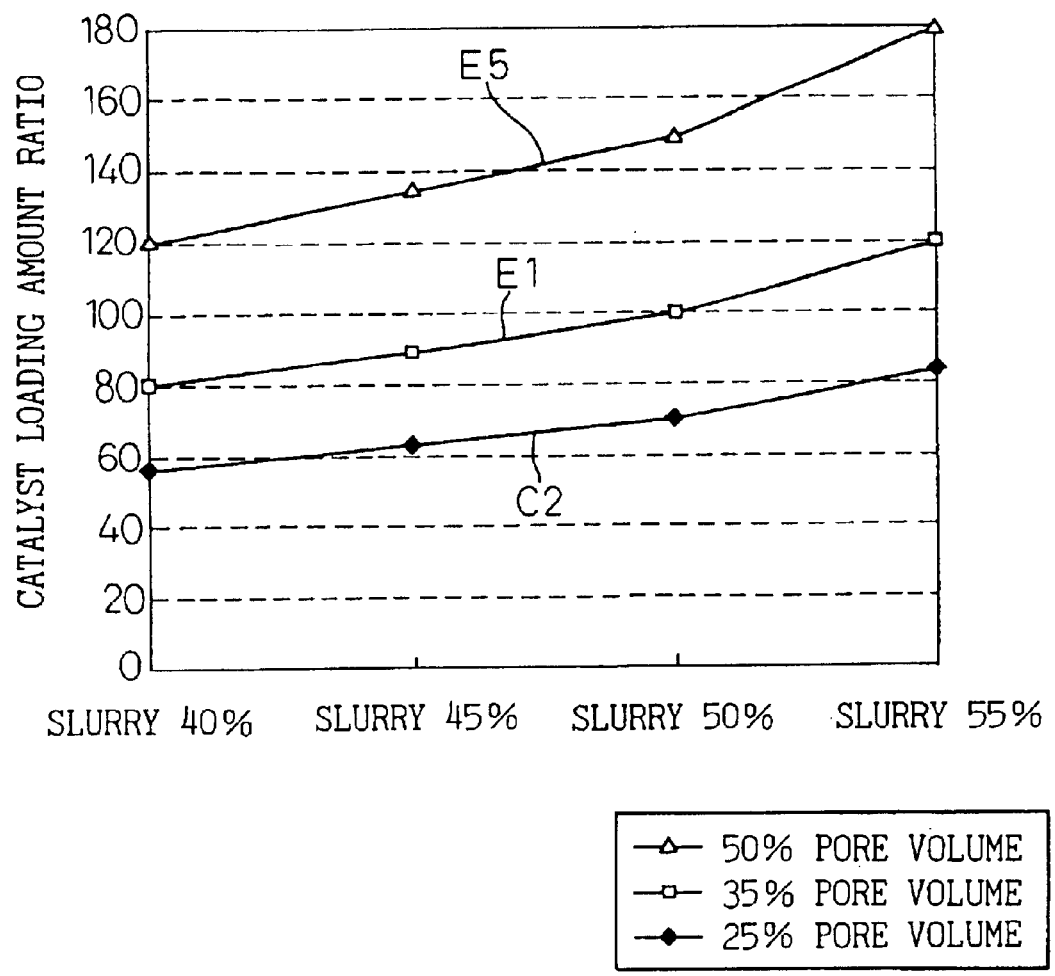
FIG. 3 is a graph showing the relationship between slurry concentration and catalyst loading amount ratio for Embodiment 2.

The measurement results are shown in FIG. 3. This graph has the slurry concentration (%) on the horizontal axis and the catalyst loading amount ratio on the vertical axis.

As is clear from this graph, the catalyst loading amount was greater with higher catalyst concentration at all of the pore volumes.

It can also be seen that, for the same catalyst concentration, a higher pore volume results in a greater catalyst loading amount.

Upon comparing the conventional product of sample C2 (pore volume: 25%) and the invention product of sample E1 (pore volume: 35%) in this graph, the loading amount is the same when coating the former with the catalyst slurry having a concentration of 55% and when coating the latter with the catalyst slurry having a concentration of 40%. These results demonstrate that increasing the pore volume from 25% to 35% makes it possible to reduce the slurry concentration by 15% to load the same amount of catalyst.

In other words, in a honeycomb structural body with a high cell density of 600 cells/in$^2$ or greater, a lower concentration of catalyst slurry may be used without increasing the number of coatings, by increasing the pore volume of the partition walls to at least 35%. The lower concentration of the catalyst slurry can prevent cell clogging, as demonstrated by Embodiment 1.

Embodiment 3

For this embodiment, catalyst-loaded honeycomb structural bodies were fabricated having specifications equivalent to the invention product according to Embodiment 1, with the cell density changed within a range of 400–1200 cells/in$^2$ and the partition wall thickness changed within a range of 0.05–0.175 mm, and the exhaust gas purification performance and pressure loss were evaluated with respect to the cell density and partition wall thickness.

The prepared honeycomb structural bodies were of 5 different cell densities: 400, 600, 700, 800 and 1200 cells/in$^2$, and of 6 different partition wall thicknesses: 0.05, 0.075, 0.1, 0.125, 0.15 and 0.175 mm, for a total of 30 types.

The pore volumes were all 35%, and all of the loaded catalysts were ternary catalysts.

The purification performance of these honeycomb structural bodies was evaluated in the following manner using a 2000 cc gasoline engine. First, the catalyst-loaded honeycomb structural body (hereunder referred to simply as the catalyst) was situated at a prescribed position in an exhaust pipe and the total emission of HC, CO and NOx was examined before and after it. The purification rate was determined as the value of the total emission after passage through the catalyst divided by the total emission before passage, and the purification performance ratio was evaluated as the proportion with respect to the purification rate for 400 cells/in$^2$, 0.175 mm wall thickness defined as 100.

Figure 4:
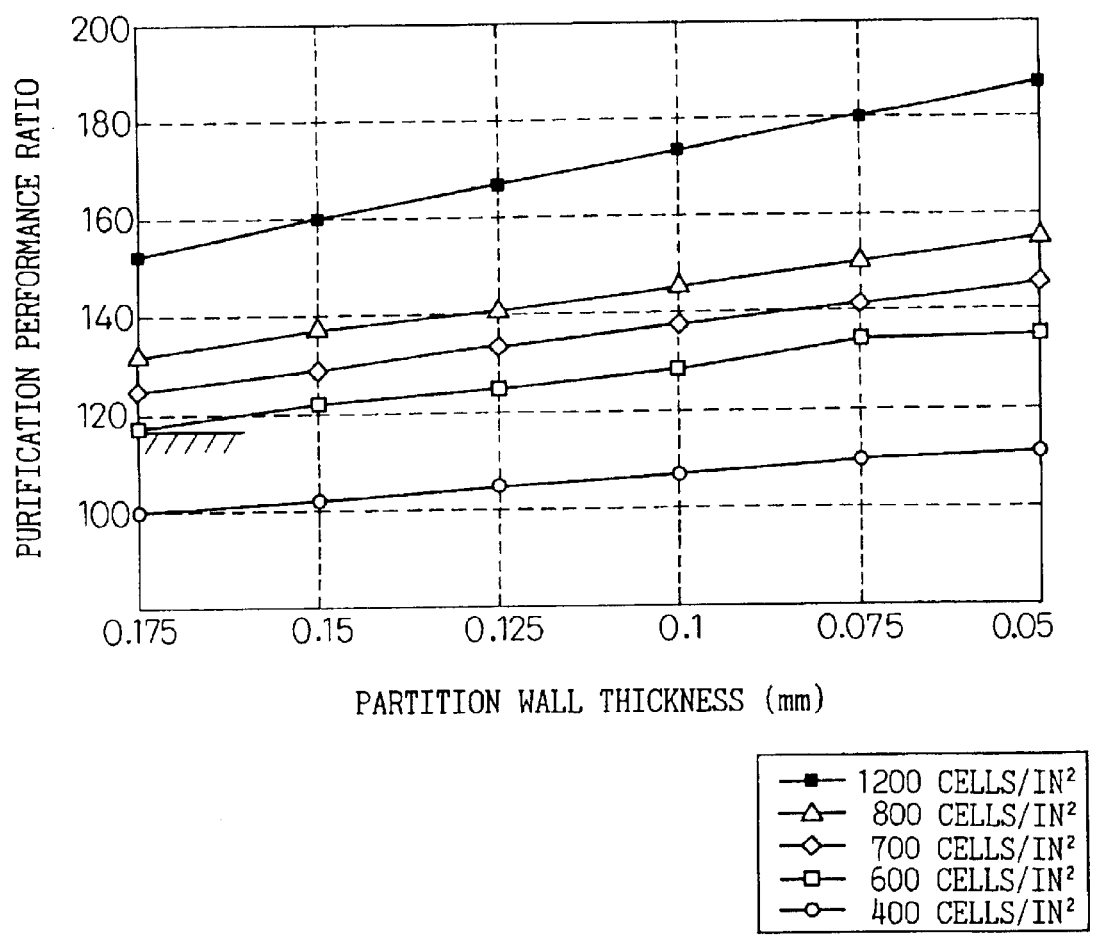
FIG. 4 is a graph showing the relationship between partition wall thickness and purification performance ratio for Embodiment 3.

The evaluation results are shown in FIG. 4. This graph shows the partition wall thickness (mm) on the horizontal axis and the purification performance ratio on the vertical axis.

As is clearly shown in this graph, a higher cell density and thinner partition walls result in improved purification performance. In particular, it is seen that a cell density of 600 cells/in$^2$ or greater can exhibit more excellent purification performance than 400 cells/in$^2$, regardless of the thickness of the partition walls.

The pressure loss in the honeycomb structural body was then evaluated by measuring the differential pressure across the catalyst situated in the engine exhaust pipe, and determining the pressure loss ratio as the proportion with respect to 100 as the differential pressure for 400 cells/in$^2$, 0.175 mm.

Figure 5:
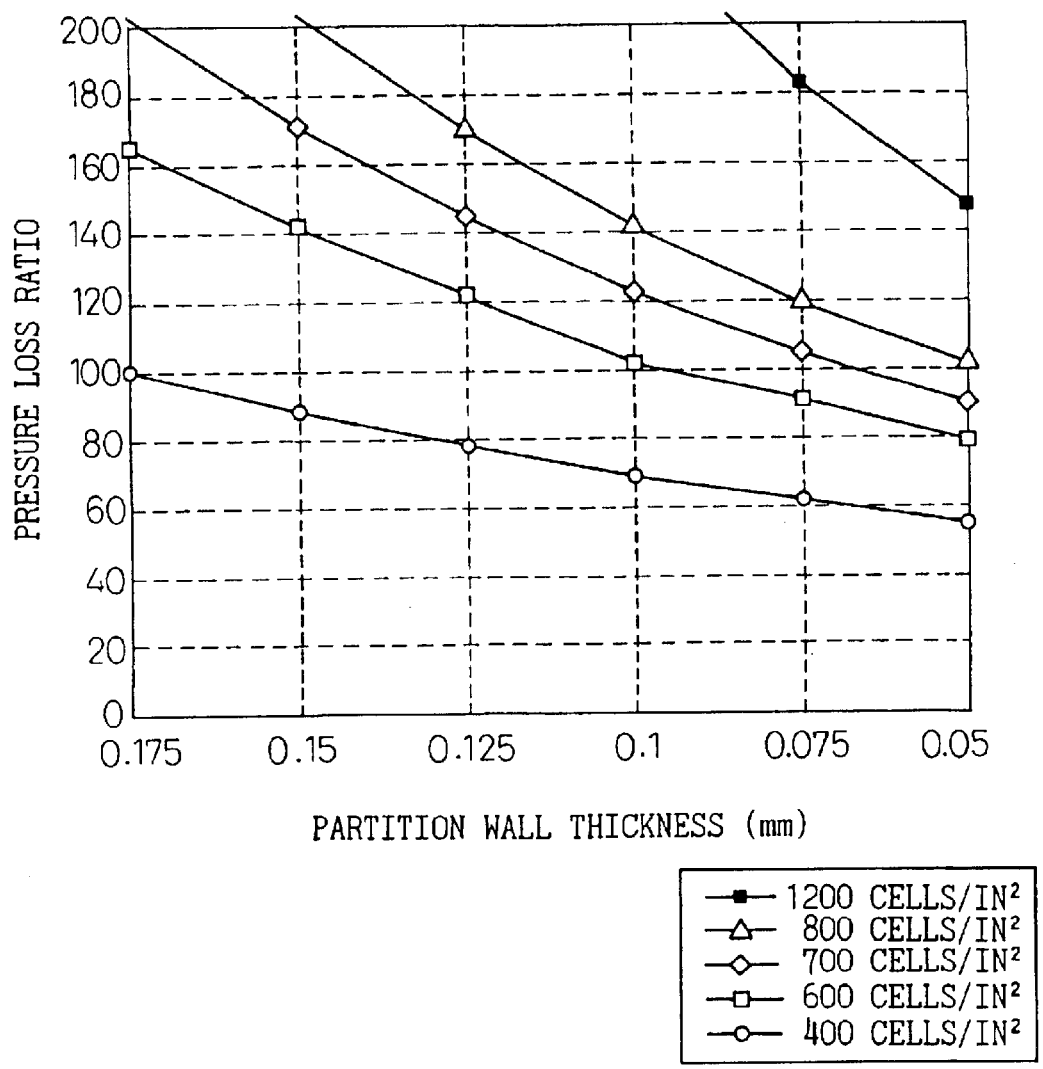
FIG. 5 is a graph showing the relationship between partition wall thickness and pressure loss ratio for Embodiment 3.
Figure 6:
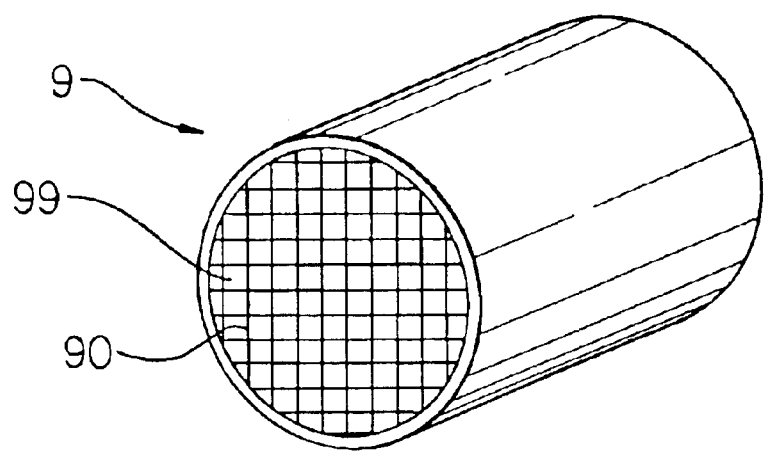
FIG. 6 is a perspective view showing the structure of a honeycomb structural body according to a prior art example.
Figure 7:
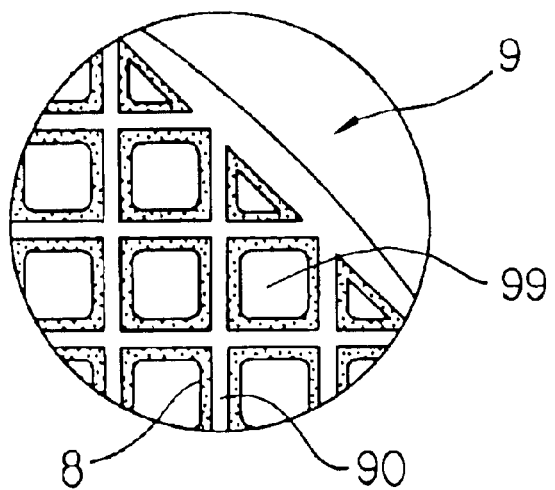
FIG. 7 is a magnified view showing the catalyst-loaded state of the partition walls in the prior art example.

The evaluation results are shown in FIG. 5. This graph shows the partition wall thickness (mm) on the horizontal axis and the pressure loss ratio on the vertical axis.

As is clearly shown in this graph, a higher cell density and a thinner partition wall thickness results in lower pressure loss. In particular, it can be seen that when the cell density is 600 cells/in$^2$, more excellent pressure loss properties can be obtained than 400 cells/in$^2$ having a partition wall thickness of 175 $\mu$m, by making the partition wall thickness at least no greater than 85 $\mu$m.

Incidentally, all of the embodiments described above have cell shapes that are quadrilateral (square shapes), but similar results are achieved when the shape is changed to hexagonal.

What is claimed is:

1. A honeycomb structural body comprising:

plurality of cells having through-holes formed by providing partition walls composed mainly of cordierite, which has the chemical composition SiO$_2$: 45–55 wt %, Al$_2$O$_3$: 33–42 wt %, MgO: 12–18 wt %, in a honeycomb fashion, the honeycomb structural body having a cell density of at least 600 cells/in$^2$, a pore volume of said partition walls being at least 30%, an average roughness Rz of the surface of said partition walls being 1–5 $\mu$m, and said honeycomb structural body being a catalyst carrier having a catalyst loaded on the surface of said partition walls.

2. A honeycomb structural body according to claim 1, wherein a thickness of said partition walls being no greater than 80 $\mu$m.

3. A honeycomb structural body according to claim 1, wherein a mean size of fine pores formed inside said partition walls being 1–10 $\mu$m.

4. A honeycomb structural body according to claim 1, said honeycomb structural body being arranged for insertion in an exhaust gas purification apparatus of an internal combustion engine.

5. A honeycomb structural body comprising:

plurality of cells having through-holes formed by providing partition walls composed mainly of cordierite, which has the chemical composition SiO$_2$: 45–55 wt %, Al$_2$O$_3$: 33–42 wt %, MgO: 12–18 wt %, in a honeycomb fashion, the honeycomb structural body having a cell density of at least 600 cells/in$^2$, a pore volume of said partition walls being at least 35%–80%, an average roughness Rz of the surface of said partition walls being 1–5 μm, and said honeycomb structural body being a catalyst carrier having a catalyst loaded on the surface of said partition walls.

6. A honeycomb structural body according to claim 5, characterized in that the thickness of said partition walls is no greater than 80 μm.

7. A honeycomb structural body according to claim 5, characterized in that the mean size of the fine pores formed inside said partition walls is 1–10 μm.

8. A honeycomb structural body according to claim 5, honeycomb structural body being arranged for insertion in an exhaust gas purification apparatus of an internal combustion engine.

* * * * *